UNITED STATES PATENT OFFICE.

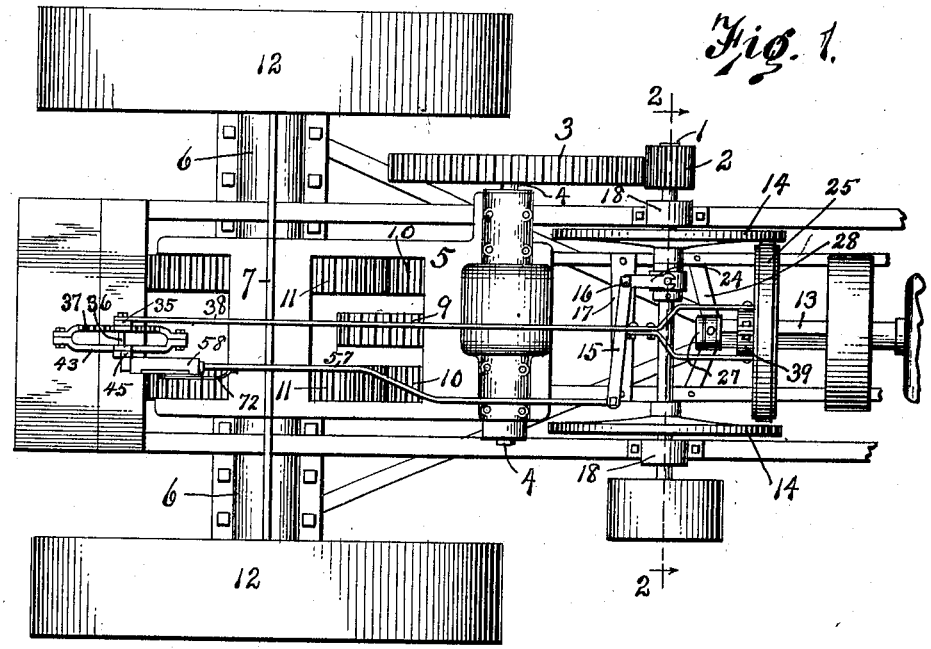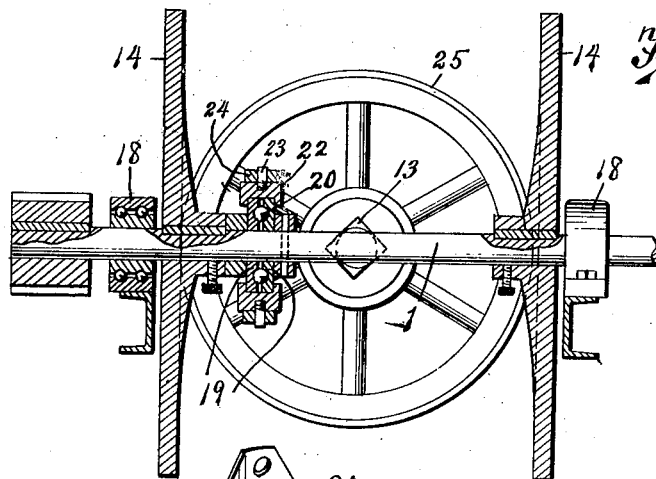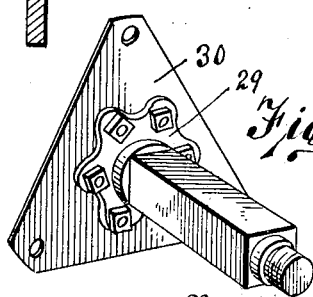

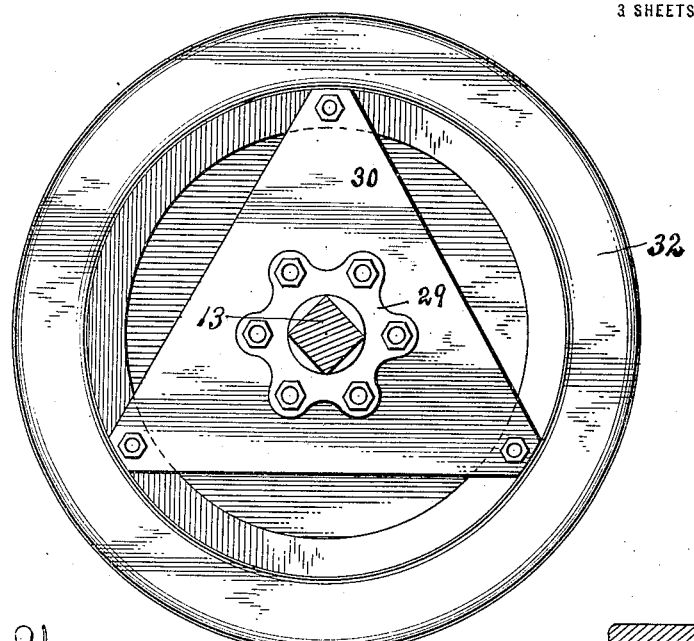
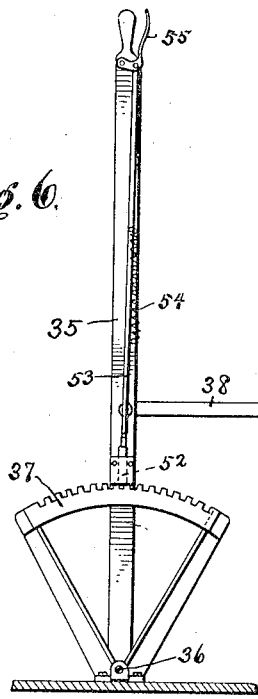
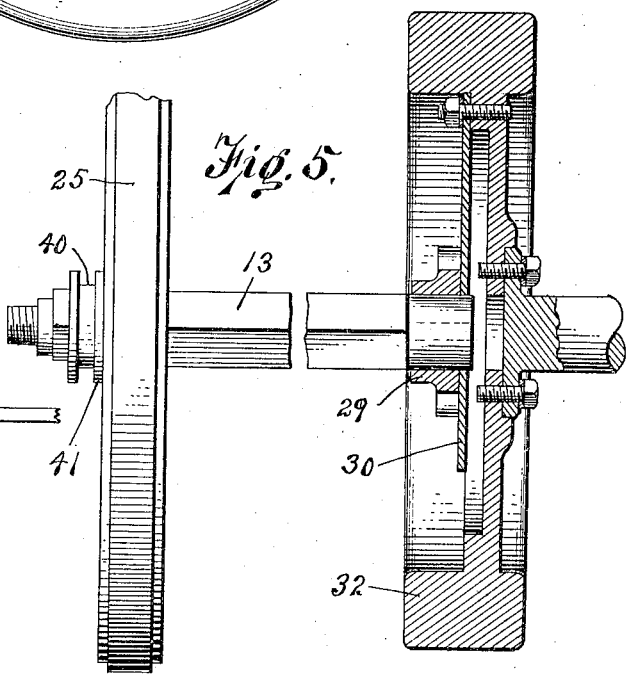

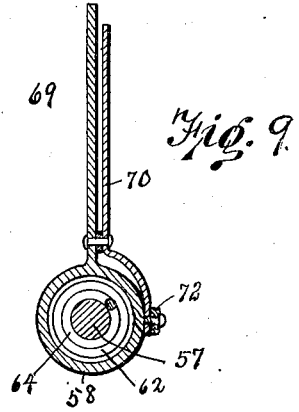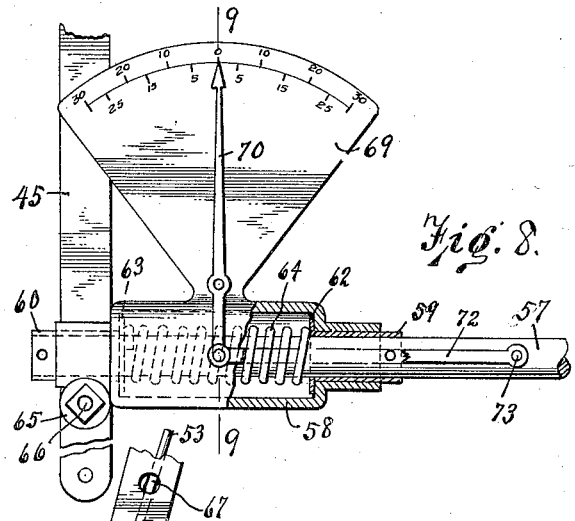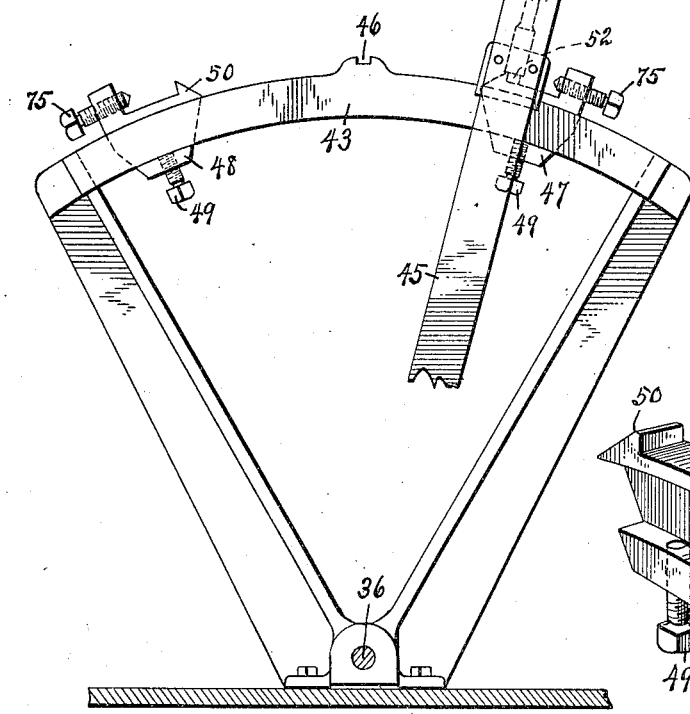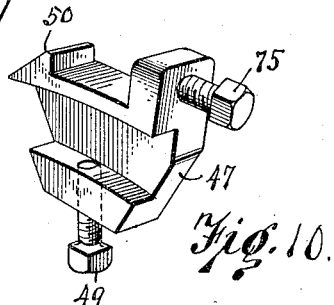

ALBERT H. BAIRD, OF PORT HURON, MICHIGAN, ASSIGNOR TO PORT HURON ENGINE & THRESHER COMPANY, OF PORT HURON, MICHIGAN, A CORPORATION OF MICHIGAN.

TRACTOR DRIVING MECHANISM.

1,330,298.  Specification of Letters Patent.  Patented Feb. 10, 1920.

Application filed April 18, 1919. Serial No. 290,910.

*To all whom it may concern:*

Be it known that I, ALBERT H. BAIRD, a citizen of the United States, and residing at Port Huron, in the county of St. Clair and State of Michigan, have invented a new and Improved Tractor Driving Mechanism, of which the following is a specification.

This invention relates to motor vehicles whose driving mechanism embodies a friction wheel connected directly to the engine and a pair of friction disks either of which may be carried to engage the friction wheel through the action of a reverse lever, and the object is to provide improved means for controlling the pressure between the friction wheel and either disk and to provide a novel resident connection between the shaft for the friction wheel and the engine which will reduce the tendency of this shaft to break.

This invention consists in a novel construction of quadrant for the pressure-control lever of the friction gearing of the driving mechanism of motor vehicles comprising normal stops for the lever so as to cause a predetermined pressure between the frictional members, sufficient to drive the vehicle after it has started, and auxiliary stops for the lever which permit extraordinary pressures between the frictional members for the purpose of starting the vehicle. It further consists in mounting a spring between the control lever and the connecting rod extending therefrom to the frictional devices, which spring will transmit the stresses from the lever to the connecting rod. It also consists in connecting an indicator to the control lever and the rod extending therefrom for the purpose of determining the stresses between the frictional elements. It also consists in providing a flexible coupling between the shaft for the friction wheel and the main shaft of the engine for the purpose of reducing the tendency of this friction-wheel shaft and its connections to break. It also consists in the details of construction illustrated in the accompanying drawings and particularly pointed out in the claims.

In the accompanying drawings, Figure 1 is a plan of the rear portion of a tractor. Fig. 2 is a section on the line 2—2 of Fig. 1 on a larger scale. Fig. 3 is a perspective view of a driving shaft. Fig. 4 is a rear elevation of a fly-wheel. Fig. 5 is a longitudinal section of the fly-wheel and elevation of a friction wheel. Fig. 6 is an elevation of the speed-control lever for positioning the friction wheel on its shaft. Fig. 7 is an elevation of the quadrant for the reversing lever. Fig. 8 is an elevation of the pressure lever. Fig. 9 is a section on the line 9—9 of Fig. 8. Fig. 10 is a perspective view of an adjustable stop.

Similar reference characters refer to like parts throughout the several views.

Great trouble has been experienced in friction driven tractors because of the main drive shaft which carries the friction wheel getting out of alinement because of the pressure thereon and because of the twisting of the frame of the tractor when passing over rough roads, resulting in broken shafts or connections between them and the engines. Other troubles have arisen out of the unnecessary pressures applied to the frictional driving elements because of lack of experience of the operators and because of lack of means to determine such pressures. The present construction overcomes these difficulties and enables even unskilled workmen to apply the proper pressure to the frictional driving members.

In Fig. 1 the driving mechanism for the tractor wheels 12 consisting of the shaft 1, pinion 2, gear 3 on the shaft 4, frame 5 with its bearings 6 and the rib 7 to stiffen the frame, gear 9, pinions 10 and gears 11 is substantially the same as that shown in the application of Chrestenson, Serial No. 290,646, filed April 17, 1919, and forms no part of this present invention. The tractor wheels may be connected directly to the gears 11 which are driven by the pinion 10 on the same shaft (not shown) with the gear 9 of a differential mechanism (not shown), which gear 9 is driven by a pinion (not shown) on the shaft 4. This shaft is driven by the pinion 2 engaging the gear 3 and the shaft 1 and its two friction disks 14 secured thereto are movable endwise by means of a bell-crank mounted on the pin 16 carried by a cross bar 17.

This shaft 1 is mounted in bearings 18, as shown in Fig. 2, and on it are two thrust rings 19 with balls 20 between them. A collar 22 surrounds these thrust rings and carries pins 23 which are engaged by the ends of the forked short arm 24 of the bell-crank 15. As the transverse arm 15 of the bell-crank is moved forward or back, one or the other of the friction disks engages the friction wheel 25 which is slidable on the square driving shaft 13. The rear end of this shaft is mounted in a bearing 27 supported by the cross 28 while the front end is preferably formed with a spider 29 (Fig. 3) which is bolted to a thin flexible angular plate 30, preferably of steel, and this in turn is bolted at its corners to the spider of the fly-wheel 32 of the engine, as shown in Fig. 6. The shaft will, therefore, yield to the stresses caused by the twisting of the chassis and also caused by undue pressures received from the disks 14.

The friction wheel 25 is slidable on this shaft, in order to change the speed of the vehicle, by means of a lever 35, shown in Fig. 6, mounted on a pin 36 at the center of a quadrant 37, the quadrant being preferably mounted at the rear end of the tractor. A connecting rod 38 extends forward from this lever to the friction disk 25 where it is forked, its ends connecting to a collar 39 which rides in the groove 40 in the hub 41 of the friction wheel. See Fig. 5. By moving this friction wheel in and out from the shaft 1, the speed of the vehicle for constant revolutions of the engine is determined.

Adjacent the quadrant 37 is a second quadrant 43, at the center of which is the pin 36 on which the reverse lever 45 is also mounted. The quadrant has a neutral notch 46 and two adjustable stops 47 and 48, each secured in position by a screw 49. The shoulders 50 on these stops are inclined toward the center of the quadrant so that the dog 52 on the lever may ride up and over the shoulders without being manually lifted. As shown in Fig. 6, this dog is at the end of a link 53 and is normally held down by a spring 54, but may be raised by a lifter 55. This mechanism is also employed on the lever 45.

Extending rearwardly from the end of the arm 15 of the bell-crank which moves the friction disks is a connecting rod 57, whose rear end is shown in Fig. 8. This end is slidable in a case 58 and connected to it are two sleeves 59 and 60 between which, within the case, are two washers 62 and 63 and a compression spring 64 between them. The sleeves 59 and 60 are freely slidable within the case, which has a lug 65 provided with a hole to receive the bolt 66 that extends through a hole 67 (Fig. 7) in the reverse lever 45.

When the reverse lever is moved forward to the right in Fig. 8, the case will push the rear washer 63 forward against the spring 64, compressing it and causing it to press against the washer 62 and this washer against the sleeve 59 which is rigid with the rod 57. On the case is a graduated dial 69 and on this dial is pivoted a pointer 70 whose lower end connects to a link 72 connected to a pin 73 on the connecting rod 57. The pressure on the spring and its compression, and the pressure on the rod 57 and between the friction disks and friction wheel 25 will therefore always be indicated by this pointer 70.

The desired pressure between the friction wheel 25 and the disks 14 having been determined the lever 45 is pulled back until the pointer 70 indicates this pressure, whereupon the stop 48 is locked with its shoulder 50 against the dog 52 on the lever 45. The stop 47 is then adjusted in a similar manner. When the vehicle is to be started the pressure between the frictional members should usually be somewhat greater than that necessary for regular running. The screws 75, carried by these stops may be adjusted to permit the lever to be pulled a sufficient distance farther from the neutral notch 46 to give this increased pressure.

When the vehicle is to be started, the lever 45 is placed central with its dog 52 in the notch 46, and the engine is started. The friction wheel 25 is then preferably moved forwardly as far as possible by the lever 35 so that the engine may have as much leverage as possible. The lever 45 is then pulled back (to the left in Fig. 7), the dog 52 riding up and over the shoulder 50 of the stop 48, until this dog strikes the adjusting screw 75, at which time the greatest permissible pressure is exerted by the left-hand disk 14 on the friction wheel 25. After the vehicle has started, the lever 45 is released whereupon the spring 64 will move it forward until the dog 52 engages the shoulder 50 of this rear stop 48, at which point the proper pressure between the frictional members will be had.

It will thus be seen that the driver need only release his dog 52 from the central notch 46 and pull back the lever until it stops in order to cause "starting" pressure between the frictional members, and then to merely let go of this lever in order to obtain "running" pressure. The operation is the same when the vehicle is to run backward, excepting that the reverse lever 45 is pushed forward.

The details of construction and the proportions of the parts may all be changed by automotive engineers without departing from the spirit of my invention as set forth in the following claims.

I claim:—

1. In a friction drive, the combination of a pair of alined disks and a wheel between them, means to move the disks axially in either direction embodying a bell-crank lever connected to said disks and a rod connected at one end to said bell crank, a compression spring mounted on the opposite end of the rod, a case wherein said spring is inclosed, and a lever connected to said case whereby the disks may be moved in either direction through the instrumentality of said spring and rod.

2. In a reversible friction drive, the combination of a pair of frictionally driven disks and a driving wheel between them, a lever, adjustable stops to limit the movement of the lever, a spring and means for transmitting stresses from said lever to the spring when the lever is moved in either direction, and means for transmitting stresses from said spring to cause pressure between the driving wheel and one or the other disk as the lever is moved in one direction or the other.

3. In a reversible friction drive, the combination of a pair of frictionally driven disks and a driving wheel between them, a lever, a spring and means for transmitting stresses from said lever to the spring when the lever is moved in either direction, means for transmitting stresses from said spring to cause pressure between the driving wheel and one or the other disk as the lever is moved in one direction or the other, and means for indicating the stresses on said spring.

4. In a reversible friction drive, the combination of a pair of frictionally driven disks and a driving wheel between them, a lever, a spring and means for transmitting stresses from said lever to the spring when the lever is moved in either direction, means for transmitting stresses from said spring to cause pressure between the driving wheel and one or the other disk as the lever is moved in one direction or the other, and a plurality of adjustable stops at each end of the travel of said lever to predetermine maximum and minimum pressures between said driving members.

5. In a reversible friction drive, the combination of a pair of connected friction disks and a driving wheel between them, means to move the wheel axially of the disks, a bell-crank pivoted adjacent said disks and adapted to move one or the other into engagement with said wheel, a reverse lever and a spring case connected to the lever, a compression spring within the case and adapted to be stressed by said lever when moved in either direction, a connecting rod slidable in the case and connected to said spring so that it will receive the stresses imparted to the spring by said lever, and means connecting one end of the connecting rod to said bell-crank.

6. In a reversible friction drive, the combination of a quadrant having adjustable stops, each provided with an inclined shoulder and a stop screw, a lever pivoted at the center of the quadrant and having a dog adapted to engage said shoulders and screws, a spring case pivoted to the lever, a connecting rod extending from the case to the frictional driving elements of a motor vehicle, a spring on the rod within the case, and means whereby the lever will compress the spring to move the rod when the lever is moved in either direction.

7. The combination of a lever pivoted at one end, a quadrant and means to hold the lever at desired positions relative to the quadrant, a case connected to said lever, a compression coil spring within the case, a rod slidable in the case and extending through the spring, and means secured to the rod at each end of the spring by means of which the spring may be compressed including disks within the case of larger diameter than the openings for said rod.

8. The combination of a lever pivoted at one end, a quadrant and means to hold the lever at desired positions relative to the quadrant, a case connected to said lever, a compression coil spring within the case, a rod slidable in the case and extending through the spring, and means secured to the rod at each end of the spring by means of which the spring may be compressed including disks within the case of larger diameter than the openings for said rod, a dial on the case, an indicator pivoted on the case to swing over the dial, and a connector between the rod and indicator whereby longitudinal movement of the rod in the case will cause the indicator to move over the dial.

ALBERT H. BAIRD.